United States Patent [19]

Kazakis

[11] Patent Number: 5,287,754
[45] Date of Patent: Feb. 22, 1994

[54] MASS FLOW METER

[75] Inventor: Ioannis Kazakis, Karlsruhe, Fed. Rep. of Germany

[73] Assignee: Krohne Messtechnik Massametron GmbH & Co., Fed. Rep. of Germany

[21] Appl. No.: 893,388

[22] Filed: Jun. 4, 1992

[30] Foreign Application Priority Data

Jun. 9, 1991 [DE] Fed. Rep. of Germany ....... 4118877
Sep. 3, 1991 [DE] Fed. Rep. of Germany ....... 4129181

[51] Int. Cl.⁵ .............................................. G01F 1/84
[52] U.S. Cl. .................................................. 73/861.38
[58] Field of Search ........................ 73/861.37, 861.38

[56] References Cited

U.S. PATENT DOCUMENTS

| 4,628,774 | 12/1986 | Lew | 73/861.38 |
| 5,066,241 | 11/1991 | Hills | 439/260 |
| 5,129,263 | 7/1992 | Chi | 73/861.38 |

FOREIGN PATENT DOCUMENTS 3824351 1/1990 Fed. Rep. of Germany .
9012611[U] 11/1990 Fed. Rep. of Germany .
0041319 2/1991 Japan ................................. 73/861.38

*Primary Examiner*—Herbert Goldstein
*Attorney, Agent, or Firm*—Cesari and McKenna

[57] ABSTRACT

A mass flow meter for flowing media that works on the Coriolis Principle includes a line inlet, at least one Coriolis line carrying the flowing medium, at least one line outlet, at least one oscillator, influencing the Coriolis line, at least one oscillating transducer detecting Coriolis forces and/or Coriolis oscillations based on Coriolis forces and a meter housing. The Coriolis line is connected to the carrier system and the line inlet and the line outlet are connected between the carrier systems and the housing. The flow meter is largely "oscillation self-sufficient" because the carrier system has a natural frequency that is substantially greater than the Coriolis lines natural line frequency and the Coriolis natural frequency. Also, the natural frequency of the flow meter as a whole is substantially smaller than the carrier-system natural frequency.

14 Claims, 2 Drawing Sheets

Fig. 2
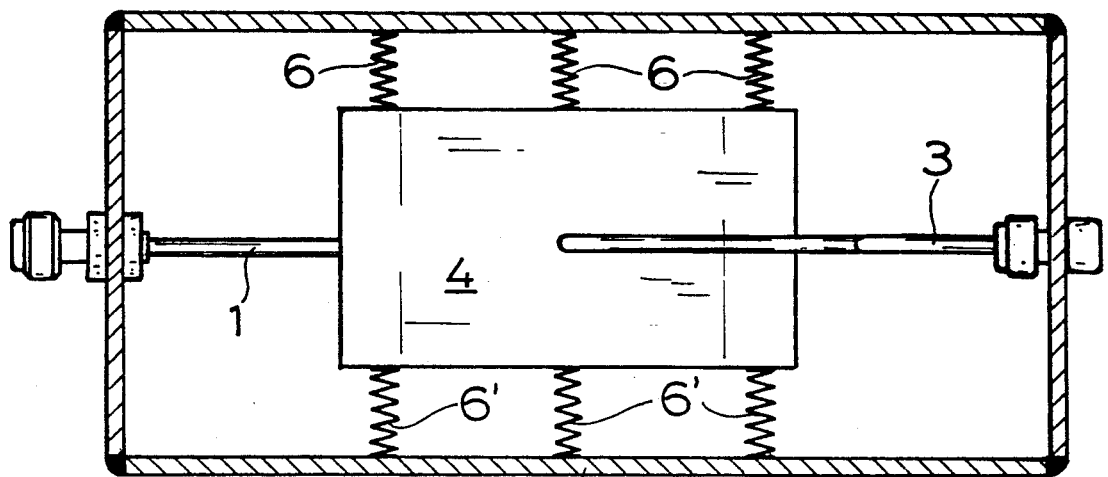
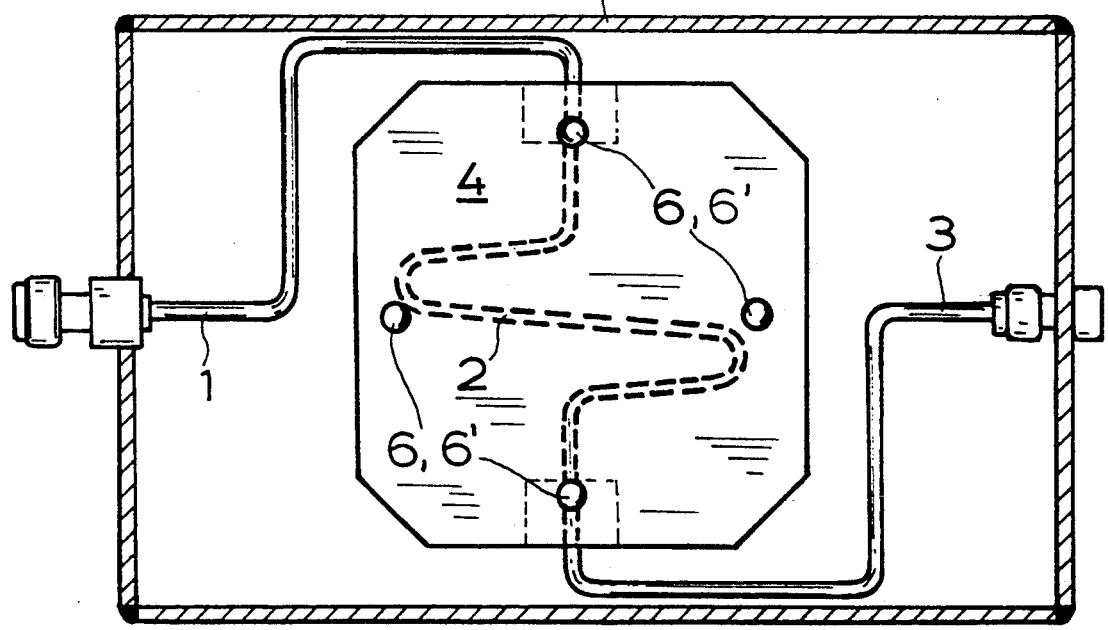
Fig. 3

MASS FLOW METER

FIELD OF THE INVENTION

This invention concerns a mass flow meter for flowing media that works on the Coriolis Principle, with a pipe inlet, with at least one Coriolis line carrying the flowing medium, with one pipe outlet, with at least one oscillator acting on the Coriolis line and with at least one oscillation transducer that detects Coriolis forces and/or Coriolis oscillations based on Coriolis forces.

BACKGROUND OF THE INVENTION

Mass flow meters for flowing media that work on the Coriolis Principle are known in various embodiments (see, for example, German Disclosure Documents 26 29 833, 28 22 087, 28 33 037, 29 38 498, 30 07 361, 33 29 544, 34 43 234, 35 03 841, 35 05 166, 35 26 297, 37 07 777, 39 16 285 and 40 16 907, European Disclosure Documents 0 083 144, 0 109 218, 0 119 638, 0 196 150, 0 210 308, 0 212 782, 0 235 274, 0 239 679, 0 243 468, 0 244 692, 0 271 605, 0 275 367 and 0 282 522, as well as U.S. Pat. Nos. 4,491,009, 4,628,744 and 4,666,421), and are increasingly being used in practice.

In mass flow meters for flowing media that work on the Coriolis Principle, there is a basic difference between those instruments whose Coriolis line is designed as a straight pipe and others whose Coriolis line is designed as a—single or multiple—curved pipe and as a pipe loop. For the mass flow meters in question, there is also a difference between those that have only one Coriolis line and those that have two Coriolis lines; in designs with two Coriolis lines, they may be connected in series or in parallel to one another, according to the flow technology. All these different flow meter embodiments have advantages and disadvantages.

The embodiments of mass flow meters in which the Coriolis line is designed as a straight pipe and in which Coriolis lines are designed as straight pipes are simple to produce as far as their mechanical constructions are concerned and consequently cost relatively little. For example, the inner surfaces of each pipe can be processed easily, e.g., polished. Also, their pressure loss is low. They are disadvantaged in that at a certain structural length, their natural frequency is relatively high. Embodiments of the mass flow meters in which the Coriolis line(s) is/are designed as a curved pipe(s) have disadvantages where the embodiments with straight pipe(s) have advantages; but their advantage is that at a certain structural length, their natural frequency is relatively low.

Mass flow meters that work on the Coriolis Principle have an oscillating system or one capable of oscillating. The Coriolis line has a natural line frequency and an oscillator oscillates the line at a selected driving frequency. Usually, the oscillator oscillates at the natural line frequency, i.e., the Coriolis line is excited by the oscillator at an oscillation frequency that corresponds to the natural frequency for the Coriolis line. The Coriolis natural frequency should be the oscillation frequency preferably excited by the Coriolis force. The fact that mass flow meters that work on the Coriolis Principle represent an oscillating system or one capable of oscillating leads to the fact that, on one hand, the oscillations are transferred to the line into which the mass flow meter is inserted, and that, on the other hand, oscillations in the line in which the mass flow meter is inserted are transferred to the mass flow meter and distort the measurement results; naturally neither one of these effects is desired.

SUMMARY OF THE INVENTION

Accordingly, it is an object of the invention to provide an improved mass flow meter that works on the Coriolis Principle.

Another object is to provide a flow meter of this type which is decoupled oscillation-wise from the fluid line into which the flow meter is inserted.

Other objects will, in part, be obvious and will, in part, appear hereinafter. The invention accordingly comprises the features of construction, combination of elements and arrangement of parts which will be exemplified in the following detailed description, and the scope of the invention will be indicated in the claims.

The invention seeks to provide a mass flow meter that works on the Coriolis Principle that is largely "oscillation self-sufficient". By this we mean that, on one hand, the meter's own oscillations are, in practice, not transferred to the line into which the mass flow meter is inserted and that, on the other hand, oscillations in the line into which the mass flow meter is inserted are, in practice, not transferred to the mass flow meter's own measuring system.

The mass flow meter according to the invention, which meets these criteria, is now characterized first and foremost by the fact that: the Coriolis line is connected to a carrier system which is, in turn, connected by the line inlet and outlet to the outer connections of the flow meter by which the Coriolis line is coupled to the line in which the flow meter is inserted; the carrier system has a natural frequency that is substantially greater than the natural line frequency of the Coriolis line and the Coriolis natural frequency, and the natural frequency of the carrier system is substantially greater than the natural frequency of the flow meter as a whole.

According to the invention, "natural-frequency-based decouplings" are thus virtually put into practice. The carrier system of this invention, which goes between the inherent measuring system and the outer connections of the mass flow meter of the invention, depending on the natural line frequency, is decoupled, on one hand, from the inherent measuring system by the fact that the carrier system's natural frequency is substantially greater than the Coriolis line's natural frequency and the Coriolis natural frequency, and, on the other hand, from the outer connections of the mass flow meter of the invention by the fact that the meter's total natural frequency is substantially smaller than the natural frequency of the carrier system.

Taken separately now, there are various ways of building and improving on the mass flow meter, which will be explained below only as examples.

The theory behind the invention is that the natural frequency of the carrier system is substantially greater than the Coriolis line's natural frequency and the Coriolis natural frequency and that the natural frequency of the flow meter is substantially smaller than the natural line frequency of the carrier system. This allows the natural frequency of the carrier system to be many times greater than the natural line frequency of the Coriolis line and the Coriolis natural frequency, and the natural frequency of the meter as a whole to be many times smaller than the natural frequency of the carrier system.

In mass flow meters like the one in question, the Coriolis line's natural line frequency and the Coriolis natural frequency are generally around 100 to 150 Hz, preferably 120 to 140 Hz. It is advisable to set the natural frequency of the carrier system at around 2000 Hz and the natural frequency of the flow meter at around 20 Hz. Then, the natural frequency of the meter is not only substantially smaller than the natural frequency of the carrier system, but it is also many times smaller than the natural line frequency of the Coriolis line and the Coriolis natural frequency.

It will be apparent from the foregoing that the mass flow meter according to the invention has a carrier system as an added component compared to mass flow meters prior to the invention. This carrier system causes some static stress on the line inlet and line outlet. Now, in order to reduce or eliminate this stress, another theory behind the invention is that the carrier system may hang on carrier springs attached to the meter housing and/or may be supported on supporting springs attached to the meter housing. The carrier springs and/or supporting springs must be sized so that the natural frequency of the meter as a whole which is the natural frequency of the entire moving unit (i.e., line inlet-carrier system (with Coriolis line, oscillator(s), oscillating transducer(s), carrier springs and/or support springs)-line outlet) is substantially smaller than the natural line frequency of the Coriolis line and the Coriolis natural frequency; preferably, the natural frequency of the meter is at least three times smaller than the natural line frequency of the Coriolis line and the Coriolis natural frequency.

BRIEF DESCRIPTION OF THE DRAWINGS

The invention will be explained below using drawings that show only exemplary embodiments, wherein:

FIG. 2 is a side view, with parts in section, of a second embodiment of a mass flow meter according to the invention, and FIG. 3 is a view similar to FIG. 1 of the mass flow meter pictured in FIG. 2.

DESCRIPTION OF THE PREFERRED EMBODIMENTS

Figure 1:
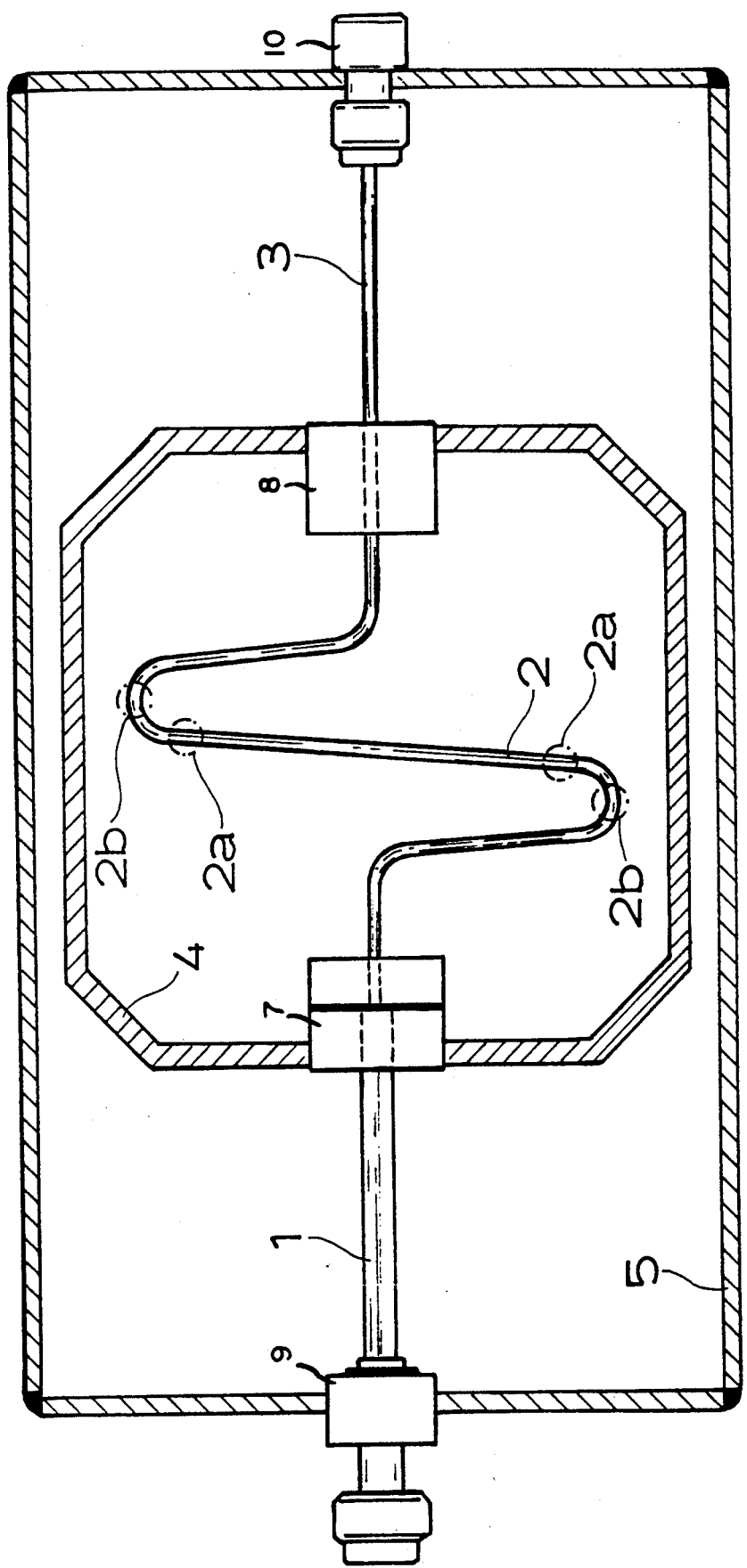
FIG. 1 is a top view, with parts in section, of a first embodiment of a mass flow meter according to the invention.

The mass flow meters for flowing media, shown only schematically in the drawings figures, work on the Coriolis Principle. The basic design of each consists of a line inlet 1, a Coriolis line or flow tube 2 carrying the flowing medium, a line outlet 3, at least one oscillator, shown in phantom at 2a, acting on the Coriolis line 2, and at least one oscillation transducer or sensor, shown in phantom at 2b, detecting Coriolis forces and/or Coriolis oscillations based on Coriolis forces.

According to the invention, there is a carrier system 4, shown in the form of a generally rectangular frame. The opposite ends of Coriolis line 2 are connected to the carrier system 4 at coupling block 7 and at block 8, respectively. The line inlet 1 and the line outlet 3 are also connected at their corresponding inner ends to the carrier system 4 at blocks 7 and 8, respectivefully, and communicate with line 2. In fact, as shown in the FIG. 1 meter embodiment, line outlet 3 may be an extension of Coriolis line 2 and line inlet 1 may be a separate pipe.

Each mass flow meter according to the invention also includes a meter housing 5. The meter housing 5 thus contains a unit made up of the line inlet 1, the carrier system 4 (including everything supported by that system) and the line outlet 3. The corresponding outer ends of inlet 1 and outlet 3 are connected to pipe fittings 10 and 12, respectively, mounted to the end walls of housing 5 and by which the flow meter may be inserted into a flow line.

According to the invention, the natural frequency of the carrier system, i.e., without the Coriolis line 2 and the oscillator(s) 2a and transducer(s) 2b, is made substantially greater than the natural line frequency of the Coriolis line 2 and the Coriolis natural frequency, i.e., the frequency of the oscillation induced in line 2 by oscillator(s) 2a. Also, the natural frequency of the flow meter as a whole, i.e., that of the whole unit inside housing 5, including line inlet 1, carrier system 4 (with line 2, oscillator(s) 2a, transducer(s) 2b) and line outlet 3, is made substantially smaller than the natural frequency of the carrier system.

The natural line frequency of the Coriolis line is influenced mainly by the length and mass of the line as well as by the elastic modulus of the line material. The natural frequency of the carrier system is influenced mostly by the geometry and mass of the carrier system and the elastic modulus of the carrier material. The natural frequency of the meter is influenced primarily by the mass of the carrier system and the geometry and elasticity of the line inlet 1 and line outlet 3. The flow meter may be given a low natural frequency advantageously by designing the line inlet 1 and the line outlet 3 as straight pipe with relatively thin walls or, as will be described presently, as curved pipe.

For the mass flow meters of the invention, shown only schematically in the figures, the Coriolis line natural line frequency and the Coriolis natural frequency are preferably 120 to 140 Hz, the carrier-system natural frequency is preferably around 2000 Hz and the natural frequency of the meter is preferably around 20 Hz.

The mass flow meter embodiment according to the invention shown in FIGS. 2 and 3 is different from the FIG. 1 embodiment in that the line inlet 1 and line outlet 3 are formed as curved pipes. Also, the carrier system 4 is hung on carrier springs 6 attached to the top wall of meter housing 5. Alternatively or additionally, springs may support the system 4 from below as shown at 6' in FIG. 2. The springs largely eliminate, or at least sharply reduce, static stresses on the line inlet 1 and the line outlet 3 due to the carrier system 4.

It will thus be seen that the objects set forth above, among those made apparent from the preceding description, are efficiently attained and, since certain changes may be made without departing from the scope of the invention, it is intended that all matter contained in the above description or shown in the accompanying drawings be interpreted as illustrative and not a limiting sense.

It should also be understood that the following claims are intended to cover all of the generic and specific features of the invention described herein.

I claim:

1. A mass flow meter for flowing media that works on the Coriolis Principle with a meter housing, a line inlet, at least one Coriolis line carrying a flowing medium, a line outlet at least one oscillator acting on the Coriolis line, at least one oscillation transducer detecting Coriolis forces and/or Coriolis oscillations based on Coriolis forces and a carrier system, wherein the line inlet, the Coriolis line and the line outlet are connected to the carrier system, the Coriolis line is supported by the carrier system and the carrier system is supported within the housing by the line inlet and the line outlet characterized by the fact that the carrier system's natural frequency is substantially greater than the Coriolis line natural line frequency and the Coriolis natural frequency as well as the flow meter natural frequency, the flow meter natural frequency being equal to the natural frequency of the structural unit comprised of the line inlet, the carrier system and the line outlet.

2. The mass flow meter according to claim 1, wherein said carrier-system natural frequency is many times greater than said Coriolis line natural line frequency and said Coriolis natural frequency.

3. The mass flow meter according to claim 2, wherein said Coriolis line natural line frequency and said Coriolis natural frequency are around 100 to 150 Hz and said carrier-system natural frequency is around 2000 Hz.

4. The mass flow meter according to claim 2, wherein said flow meter has a natural frequency which is substantially smaller than the carrier-system natural frequency.

5. The mass flow meter according to claim 3, wherein the flow meter has a natural frequency which is substantially smaller than the carrier-system natural frequency.

6. The mass flow meter according to claim 1, wherein said flow meter has a natural frequency which is many times smaller than said carrier-system natural frequency.

7. The mass flow meter according to claim 6, wherein said Coriolis line natural line frequency and said Coriolis natural frequency are around 100 to 150 Hz and said natural frequency of the flow meter is around 20 Hz.

8. The mass flow meter according to claim 1, wherein the line inlet (1) and the line outlet (3) are straight pipes having thin walls.

9. The mass flow meter according to claim 1, wherein the line inlet (1) and the line outlet (3) are curved pipes.

10. The mass flow meter according to claim 1, and further including a housing (5) and spring means (6) hanging the carrier system (4) from said housing (5).

11. The mass flow meter according to claim 1, and further including a housing (5) and spring means (6) resiliently supporting the carrier system (4) in said housing (5).

12. The mass flow meter according to claim 10 and further including a housing (5) and spring means (6') attached to said housing (5) and supporting the carrier system (4) in said housing (5).

13. The mass flow meter according to claim 3 wherein said Coriolis line natural line frequency and said Coriolis natural frequency are around 120 to 140 Hz.

14. The mass flow meter according to claim 7 wherein said Coriolis line natural line frequency and said Coriolis natural frequency are around 120 to 140 Hz.

* * * * *